US005770145A

United States Patent [19]
Gerk et al.

[11] Patent Number: 5,770,145
[45] Date of Patent: Jun. 23, 1998

[54] SUPERIOR HIGH ALKALI METAL AND CALCIUM SOL GEL ABRASIVE AND PROCESSES FOR ITS PRODUCTION

[75] Inventors: Alvin P. Gerk, Newark, Del.; Robert J. Seider, Ransomville, N.Y.

[73] Assignee: Minnesota Mining & Manufacturing Company, St. Paul, Minn.

[21] Appl. No.: 446,112

[22] Filed: May 19, 1995

Related U.S. Application Data

[63] Continuation of Ser. No. 668,360, Mar. 12, 1991, abandoned, which is a continuation-in-part of Ser. No. 445,946, Dec. 8, 1989, abandoned, which is a continuation of Ser. No. 830,478, Feb. 13, 1986, abandoned, which is a continuation-in-part of Ser. No. 666,133, Oct. 30, 1984, abandoned, which is a continuation of Ser. No. 602,272, Apr. 23, 1984, abandoned, which is a continuation of Ser. No. 377,782, May 13, 1982, abandoned, which is a continuation-in-part of Ser. No. 330,123, Dec. 14, 1981, abandoned, which is a continuation-in-part of Ser. No. 267,495, May 27, 1981, abandoned.

[51] Int. Cl.$^6$ .......................... C04B 35/10; C04B 35/64
[52] U.S. Cl. .......................... 264/621; 51/309; 264/656; 264/662; 264/681
[58] Field of Search .......................... 419/10, 19; 264/56, 264/63, 67, 60, DIG. 25, DIG. 36, 621, 656, 662, 681; 51/309

[56] References Cited

U.S. PATENT DOCUMENTS

| | | | |
|---|---|---|---|
| 1,263,709 | 4/1918 | Saunders et al. | 51/309 |
| 1,976,875 | 10/1934 | Connolly et al. | 423/625 |
| 2,519,622 | 8/1950 | Archibald et al. | 252/455 R |
| 2,552,323 | 5/1951 | Kimberlin, Jr. | 252/448 |
| 2,733,220 | 1/1956 | Wankat | 252/448 |
| 2,988,424 | 6/1961 | Walsh | 423/625 |
| 2,996,369 | 8/1961 | Harris et al. | 51/309 |
| 3,132,110 | 5/1964 | Hansford | 252/440 |
| 3,141,786 | 7/1964 | Bugosh | 501/119 |
| 3,265,465 | 8/1966 | Turpin | 423/625 |
| 3,334,962 | 8/1967 | Clearfield | 423/608 |
| 3,343,915 | 9/1967 | Rossi et al. | 419/30 |
| 3,422,167 | 1/1969 | Bowman et al. | 264/0.5 |
| 3,637,406 | 1/1972 | Bailey | 501/153 |
| 3,709,706 | 1/1973 | Sowman | 501/103 |
| 3,941,719 | 3/1976 | Yoldes | 252/463 |
| 4,045,234 | 8/1977 | Ring | 501/119 |
| 4,518,397 | 5/1985 | Leitheiser | 51/309 |

OTHER PUBLICATIONS

Badkar, et al., "The Mechanism of Simultaneous Sintering and Phase Transformation in Alumina".
Fletcher, et al., "Application of Sol–Gel Processes to Industrial Oxides".
Russell, et al., "Abrasive Characteristics of Alumina Particles".
Becher, et al., "Ceramics Sintered Directly from Sol–Gels".
Yoldas, "Alumina Gels that Form Porous Transparent $Al_2O_3$".

Primary Examiner—Daniel J. Jenkins
Attorney, Agent, or Firm—Richard Francis

[57] ABSTRACT

A process for forming a ceramic alumina-based abrasive grain from a sol gel which contains aluminum oxide monohydrate, a dissolved metal containing sintering aid and sufficient sodium and/or calcium compound to provide in the ceramic from above about 0.05 to about 1.8 weight percent sodium plus calcium, provided that the weight percent calcium is from 0 to about 1.8 and the weight percent sodium is from 0 to about 0.4. The high sodium and calcium is permitted due to rapid heating of the sol gel after drying through a temperature range of from below about 800° C. to above about 1200° C., prior to sintering the dried gel at a temperature above 1200° C. A grain made by the process and coated, bonded and non-woven abrasive articles comprising the grain.

22 Claims, No Drawings

SUPERIOR HIGH ALKALI METAL AND CALCIUM SOL GEL ABRASIVE AND PROCESSES FOR ITS PRODUCTION

REFERENCE TO RELATED APPLICATIONS

This application is a continuation of U.S. Ser. No. 668,360, filed Mar. 12, 1991, now abandoned, which is a continuation-in-part of U.S. Ser. No. 445,946, filed Dec. 8, 1989, abandoned, which is a continuation of U.S. Ser. No. 830,478, filed Feb. 13, 1986, abandoned, which is a continuation-in-part of U.S. Ser. No. 666,133, filed Oct. 30, 1984, abandoned, which is a continuation of U.S. Ser. No. 602,272, filed Apr. 23, 1984, abandoned, which is a continuation of U.S. Ser. No. 377,782, filed May 13, 1982, abandoned, which is a continuation-in-part of U.S. Ser. No. 330,123, filed Dec. 14, 1981, abandoned, which is a continuation-in-part of U.S. Ser. No. 267,495, filed May 27, 1981, abandoned.

TECHNICAL FIELD

This invention relates to abrasive grains and more particularly relates to a sintered type of abrasive grain.

BACKGROUND ART

In the prior art, abrasive grains, especially abrasive grains comprising metal oxides such as alumina, were traditionally made by fusion of the oxide followed by crushing the cooled fused oxide to form the abrasive grain.

More recently, abrasive grains have been manufactured by sintering the metal oxide, such as alumina. Such grains, while wearing reasonably well, still do not wear as long as desirable and in addition, do not cut as rapidly as desirable.

It is known that ceramic materials which may be in the form of abrasive products can be prepared by binding ceramic oxide particles together by using a mineral colloidal gel (see U.S. Pat. No. 2,455,358). It is also known that colloidal dispersions can be gelled, dried and calcined to form porous ceramic materials (see e.g., U.S. Pat. No. 4,181,532).

It has also been known that free flowing spheres of pure or mixed oxides could be made by dispersing an oxide hydrate followed by forming a gel in the shape of spheres followed by sintering (see "Application of Sol-Gel Processes to Industrial Oxides", Jan. 13, 1968, Chemistry and Industry).

It has also been known by others in the United States, at least as early as 1971, that such particles in spherical or even angular shapes could be used as abrasives. Such prior knowledge by others in the United States is evidenced by a report from the United Kingdom Atomic Energy Authority at Harwell, England, to Carborundum Company, Ltd. and subsequently to several personnel at The Carborundum Company in the United States.

Recently, U.S. Pat. No. 4,314,827 issued for a nonfused aluminum oxide-based abrasive mineral, a process for its production and abrasive products comprising the abrasive mineral.

U.S. Pat. No. 4,314,827 generally discloses that an abrasive mineral having randomly oriented crystallites with diameters on the order of 3000 Angstroms (0.3 $\mu$m) or less can be made by gelling a colloidal dispersion or hydrosol of alumina and a modifying component, followed by firing the gel. The disclosure makes it clear that the mineral must be free (less than about 0.05 total weight percent) of calcium and alkali metal. Due to this requirement, complex purification processes must be used when calcium and alkali metal are present, as they often are, in the alumina or modifying component. Calcium, for example, is usually present in commercial water supplies and in magnesium containing modifying components unless costly and complicated purification steps are used to remove the calcium. Similarly, sodium is commonly present in many aluminas unless removed by additional purification steps. There is no suggestion in the U.S. patent of any process which would permit the presence of calcium or alkali metal and no process was actually used with high calcium or alkali metal which inherently permitted the presence of high calcium or alkali metal.

DISCLOSURE OF THE INVENTION

In accordance with the present invention, a process is provided for forming ceramic particles from a gelled dispersion (sol gel), by drying and sintering the gel. The particles of the invention may be used for any suitable purpose. Such particles may be used in any application where temperature resistance, strength, hardness, wear resistance and inertness are desirable. Such particles may, for example, be used as fillers, in aggregates, in distillation columns or due to the surface porosity of some of such particles, may be used as catalyst supports. The most common use for such particles is as abrasives. Such particles will therefore be referred to herein as abrasives, although it is to be understood that the term abrasive particle or abrasive grain is intended to include such particles regardless of their intended end use.

Even though the abrasive grain product obtained by the process of this invention usually contains greater than about 0.05 weight percent sodium plus calcium, it is greatly superior to traditional fused alumina abrasive. Sufficient sodium and calcium is used in the sol gel to provide greater than about 0.05 and usually at least about 0.1 weight percent sodium plus calcium in the finished grain while still obtaining an abrasive grain product which is greatly superior traditional fused alumina abrasive. High sodium and calcium in the grain is permitted due to rapid heating of the dried sol gel through a critical temperature range of from below about 800° C. to above about 1200° C. The grain is then sintered at a temperature above about 1200° C.

The preferred process comprises preparing a dispersion comprising from about 2 to about 60 weight percent aluminum oxide monohydrate; a dissolved or dispersed metal containing sintering aid in an atomic ratio of metal to aluminum of from 1:2 to 1:35, preferably from 1:7 to 1:25; and sufficient sodium and/or calcium compound to provide in the ceramic from above about 0.05 to about 1.8 percent sodium plus calcium.

As used herein the phrase "above about 0.05% weight", when referring to the amount of sodium plus calcium in the ceramic, means an amount of sodium plus calcium which exceeds an amount which has as an upper limit about 0.05% by weight total calcium and sodium. The phrase "above about 0.05% weight" is intended to preclude any overlap of the claims of the present application, in defining the ceramic abrasive grains, with the disclosure of Leitheiser et al. U.S. Pat. No. 4,314,827.

The weight percent calcium plus the weight percent sodium is preferably less than 0.6, and more preferably less than 0.15. The weight percent calcium can range from 0 to about 1.8 and the weight percent sodium can range from about 0 to about 0.4. The weight percent calcium is preferably from 0 to about 0.6 and more preferably from 0 to about 0.15 and the weight percent sodium is preferably from 0 to about 0.25 and more preferably from 0 to about 0.1.

After the dispersion is prepared, it is gelled and dried at a temperature below the frothing temperature of the gel to remove free water. Any suitable drying method known to those skilled in the art may be used. "Drying" as used herein means dewatering by any method including solvent extraction. The dried solid is then crushed to form grains. The grains are then usually heated to between about 500° and 800° C. The grains are then rapidly heated to above about 1200° C. in less than 10 and preferably less than 5 minutes. The grains then continue to be heated at a sintering temperature between about 1200° C. and about 1650° C. for a sufficient sintering time to sinter the grains to a density above about 85% of theoretical density, at least a portion of the heating at sintering temperature preferably occurring above 1300° C.

The resulting grain is a sintered sol gel abrasive which has a combined sustained cutting rate and wear resistance against carbon steel which is substantially better than prior art fused alumina grain, and which is comparable to prior art sintered sol gel abrasive grains which require low sodium and low calcium (less than about 0.05 weight percent) as described in U.S. Pat. No. 4,314,827. "Substantially better" means a relative cutting performance at least 1.5 times better and usually at least two times better.

The invention also includes bonded, coated and non-woven abrasive articles comprising the novel grain. For example, not only do coated abrasives manufactured from the preferred abrasive grain of the invention continue to have a high cutting rate until the grain is worn from the backing, but the total quantity of material cut by the abrasive article is superior to most prior art grains.

BEST MODE FOR CARRYING OUT THE INVENTION

In accordance with the process of the invention, the grain is prepared from a liquid (preferably water) dispersion comprising from about 2 to about 60, usually from about 10 to about 40 weight percent aluminum oxide monohydrate (AlOOH); a dissolved metal containing sintering aid at an atomic ratio of metal in the sintering aid to aluminum of from 1:2 to 1:35; and sufficient sodium and/or calcium compound to provide in the ceramic from above about 0.05 to about, 1.8 percent combined alkali metal (especially sodium) and calcium by weight.

The weight percent calcium plus the weight percent sodium is preferably less than 0.6, and more preferably less than 0.15. The weight percent calcium can range from 0 to about 1.8 and the weight percent sodium can range from about 0 to about 0.4. The weight percent calcium is preferably from 0 to about 0.6 and more preferably from 0 to about 0.15 and the weight percent sodium is preferably from 0 to about 0.25 and more preferably from 0 to about 0.1.

The quantity of aluminum oxide monohydrate in the dispersion is usually from about 10 to about 40 and preferably from about 15 to about 35 percent by weight of the dispersion. Aluminum oxide monohydrate as used herein is intended to include aluminum oxide hydrates having the stochiometric formula ½($Al_2O_3.xH_2O$) where x is 0.5 to 3. Aluminum oxide monohydrate is also known as boehmite. Aluminum oxide monohydrate, as used herein, is also intended to include, without limitation, pseudo boehmite.

In general, all solids in the dispersion are preferably dissolved or in colloidal form. The dispersion is formed by any suitable means which may simply be mixing of the aluminum oxide monohydrate with water. The liquid is almost always water but may be another liquid such as low molecular weight alcohol. Any suitable mixing apparatus may be used including both high and low shear mixers. Dispersing aids such as acid are frequently employed. For example, from about 0.02 to 0.25 and preferably 0.05 to about 0.15 mole of $HNO_3$ or other volatile mineral acid per mole of aluminum oxide monohydrate greatly aids dispersion. "Volatile mineral acid" means an acid which will vaporize from the dispersion, gel or dried gel at a temperature below sintering temperature or all of whose residues will either so vaporize or form a part of an oxide within the finished grain. Examples of such acids are nitric, hydrochloric, acetic and formic acids.

The solids in the finished dispersion may comprise up to 50 weight percent of additional ingredients other than aluminum oxide monohydrate, preferably compounds such as silica, magnesia, chromia and titanium dioxide in colloidal or dissolved form, or precursors of such compounds in colloidal or dissolved form.

The dissolved or dispersed metal containing sintering aid is added to the dispersion in an atomic ratio of metal to aluminum of from 1:2 to 1:35 and preferably at a ratio of from 1:7 to 1:25 (This calculates to be 1.2 to 18% MgO and correspondingly 98.8 to 82% $Al_2O_3$ based on the combined weights of metal, if it is magnesium, and aluminum in the sintered oxidized state). The sintering aid is a dispersible or soluble metal oxide or metal oxide precursor, i.e., a compound which will form a metal oxide during drying, calcining or sintering. In general, the sintering aid is usually a precursor of magnesium oxide, zinc oxide, cobalt oxide or nickel oxide and is therefore, when the liquid is water, a water soluble or dispersible compound of magnesium, zinc, nickel or cobalt. Specific examples of such precursors are the nitrates and chlorides of those metals. The nitrates of those metals and especially of magnesium are particularly preferred. The sintering aid may be prepared in situ, for example by adding magnesium oxide or hydroxide to an aqueous solution of inorganic acid such as hydrochloric or nitric acids to form a water soluble salt of magnesium. The sintering aid is usually a water soluble salt but may be a water soluble base.

The sodium and calcium in the dispersion usually results naturally from calcium impurities in other components of the dispersion. The usual source of sodium is from alumina. The usual source of calcium is from impurities in magnesium containing sintering aid or water. "Calcium" and "sodium", as used herein, mean chemically bound calcium and sodium, which due to the electropositive nature of calcium and sodium, are almost always calcium or sodium ion, i.e., free calcium or sodium ions or tonically bound sodium or calcium.

In accordance with the process of the invention, relatively high amounts of calcium and sodium can be tolerated in the dispersion, thus complicated and expensive purification steps are avoided. In accordance with the invention, up to about 1.8 percent combined sodium and calcium can be present in the dispersion and a finished abrasive grain superior to traditional fused alumina grain will still be obtained. Preferably no more than 0.6 percent combined sodium and calcium is present. The percent sodium and calcium as above described is by weight of dispersed and dissolved metal containing solids in the dispersion. The percentages are essentially the same as the percentages in the finished abrasives.

After the dispersion is prepared, it is gelled. The addition of the dissolved or dispersed metal containing sintering aid, preferably magnesium nitrate, to the dispersion usually serves to gel the dispersion. If the solids content of the dispersion is quite low, the liquid may either have to be vaporized in order for the dispersion to gel or another method of gelling may have to be employed, i.e., the addition of a gelling agent.

After the dispersion is gelled, it is dried at a temperature below the frothing temperature of the gel to vaporize free water. "Dried" or "drying", as used herein, means that at least 90% of free (unbound) water is removed to form a solid. The "frothing temperature" is the temperature at which the gel will foam or froth at the pressure applied to the gel. Drying may be accomplished by any means known to those skilled in the art. When heat is used, the drying temperature is usually from about 80 to about 120° C. The drying time depends upon the quantity of water or other liquid present, upon drying pressure, and upon drying temperature. The drying time is usually from about 1 to about 72 hours at atmospheric pressure. The resulting dried gel is usually, but not necessarily, a translucent solid, i.e., a solid through which light will pass in diffused form.

After the solid is dry, it is crushed or broken by any suitable means such as a hammer or ball mill to form particles or grains. Any suitable method for comminuting the solid may be used and "crushing" is intended to include all such methods.

After crushing, the grains are usually heated to a temperature between about 500° C. and about 800° C. until essentially all water is removed and until all components of the grains are either in the form of ceramics (usually metal oxides) or else are vaporized. When the grains reach a temperature between about 250° C. and about 300° C., the acid residues are driven off. Between about 250° C. and about 800° C., and usually between about 300° C. and about 600° C., essentially all water is usually removed. "Essentially all", as used in this context, means that all free water and over 90 percent of bound water is removed. The calcining time to remove essentially all water is usually from about 5 to about 20 minutes.

After drying and after calcining, the grains are rapidly heated to above about 1200° C. "Rapidly heated" means sufficiently fast to permit formation of an abrasive having a good cutting rate and good wear resistance. The rapid heating usually occurs in less than 10, preferably in less than 5 and most preferably in less than 1 minute. This rapid heating step permits the formation of a superior abrasive grain from a gelled dispersion (sol gel) containing relatively high amounts of calcium and sodium. Any suitable means or method for rapidly heating the grains may be used such as injection of the grains in other than bulk form, i.e., separately, into a furnace preheated to above 1200° C. and preferably to above 1300° C.

It is possible to eliminate the calcining step and instead rapidly heat the grains to above about 1200° C. after drying. This particular procedure is particularly desirable for producing certain type abrasives.

After the grains are rapidly heated to above 1200° C., they continue to be heated at a sintering temperature between about 1200° C. and about 1650° C. and preferably between 1250° C. and 1500° C. for a sufficient sintering time to sinter the grains to a density above about 85% of theoretical density. In the case where the abrasive is primarily aluminum oxide with about 6% magnesium oxide by weight of aluminum oxide, the desired density is above about 3.3 grams per cubic centimeter. At least a portion of the heating usually occurs above 1300° C. The sufficient time to sinter the grain depends on sintering temperature and is usually from about 5 to about 30 minutes but may be less than about 5 minutes, e.g., from about 1 to about 5 minutes.

When looking at polished thin sections of sintered grain manufactured in accordance with the process of the invention in a transmission optical microscope at about 500× or 700× with crossed polarizers, one observes the microstructure of material with a nominal composition of alumina-6% magnesia to consist of areas of from about 5,000 up to about 200,000 Angstroms (about 0.5 up to about 20 $\mu$m) in nominal diameter which extinguish as a unit upon sample rotation. The extinction is believed to result, in this instance, from the birefringent alpha alumina phase which is predominant. In order for these areas to extinguish as a unit, it is believed that they have to be either continuous alpha alumina grains or areas of smaller non-randomly oriented alumina grains. If the alpha alumina grains either have a diameter ranging from about 5,000 Angstroms to about 200,000 Angstroms (about 0.5 up to about 20 $\mu$m) or have much smaller diameters but are non-randomly oriented, the weight percent combined calcium plus sodium in the grains may be less than 0.05.

The microstructure of the alumina grain of the invention differs markedly from that of normal sintered or fused alumina grain of a similar composition in the degree of homogeneity of distribution of metal oxide sintering aid. On firing previously calcined material, it is believed that a transformation from an atomistically homogeneous distribution of magnesia in gamma alumina transforms to a microscobically homogeneous intimate mixture of alumina and spinel.

Normal sintering of abrasive grains includes consolidation by either a diffusional mechanism of preexisting alpha alumina crystals or a liquid phase densification mechanism. Sintering of sol gel abrasives may include a displasive polymorphic transformation of gamma alumina to alpha alumina and spinel involving minimum diffusion. This unique transformation normally results in a marked reduction in sintering temperature.

The invention further includes bonded, coated and nonwoven abrasive articles comprising the abrasive grain of the invention. In general, the abrasive grain of the invention may be described as a sintered abrasive grain comprising alumina, a metal oxide which aids sintering, and from above about 0.05 to about 1.8, preferably to about 0.6 and most preferably to about. 0.15 weight percent combined calcium plus sodium.

As previously discussed, the preferred sintered grains manufactured in accordance with the process of the invention, have excellent wear characteristics and in addition, maintain a high cutting rate and remove larger quantities of carbon steel stock than most prior art grains. High sodium and calcium containing prior art grains do not have a combination of cutting rate and wear resistance as high as the best abrasive grains manufactured in accordance with the present invention.

As previously discussed, the sintered sol gel abrasive of the invention has a relative cutting performance on coated discs against carbon steel which is better than fused alumina abrasive. The preferred sol gel abrasives of the invention have such a cutting rate which is at least two and usually at least three to four times better than traditional fused alumina abrasive. Relative cutting performance is determined as defined and described in the following examples.

The following examples, wherein all parts and percentages are by weight unless otherwise indicated, serve to illustrate and not limit the present invention.

EXAMPLE 1

Prior Art

A high calcium sol gel abrasive grain was made essentially in accordance with a process similar to the prior art, wherein a dried high calcium sol gel was heated slowly and essentially uniformly from ambient temperature to 1370° C. In particular, 10,199 grams of Condea Chemie Disperal® boehmite was dispersed in 20.5 gallons of water and 573 ml of concentrated nitric acid was then added to form a sol (colloidal solution). 73.9 grams of titanium IV isopropoxide dispersed in 4150 ml of isopropyl alcohol and 36.5 grams of Nalco-Chemical Nalcoage®1034A colloidal silica dispersion were then mixed into the sol.

3162 grams of magnesium nitrate was dissolved in 2 gallons of water and the resulting solution was added to the sol with stirring. Gelling occurred almost immediately. Stirring was continued for about 5 minutes.

The gel was then transferred to plastic trays at a depth of about 10 centimeters. The trays were paced in a steam heated dryer to dry the gel which took about 60 hours.

The dry gel was passed through a roll crusher to reduce it to –28 mesh granules. A size fraction –28 to +48 mesh was separated by sieving.

The dry granules were placed in aluminum oxide coated saggers and placed into a kiln. The kiln was heated to 1370° C. over a period of six hours and held at 1370° C. for 30 minutes. The kiln was turned off and allowed to cool. The resulting fired grains were porous and were analyzed as having a calcium content of 0.14 weight percent. The density was less than 85% of theoretical.

The sintered granules were size classified on a conventional sifter to meet the ANSI 74.18-1977 specification for 50 grit.

A single coated abrasive material was made by electrostatically coating the 50 grit grain on a vulcanized fiber backing.

The fiber selected was abrasive grade 0.030 inch vulcanized fiber, having a nominal weight of 67 pounds per ream (480-9×11 sheets).

A maker adhesive mix, consisting of a commercial one-stage, liquid phenolic resin with a formaldehyde to phenol ratio of about 1:1 and ground limestone with an average particle size of between 17 and 25 microns, was made using a 1:1 net weight mix proportion.

The maker mix was then heated to 90° F. and roll coated on the fiber backing. About 14 pounds of adhesive per ream was applied.

Using conventional sandpaper making equipment, the 50 grit abrasive was electrostatically projected onto the fiber carrying the maker mix with about 38 pounds per ream of grain being applied.

The abrasive adhesive coated backing was then heated to 175° F. for one hour and 200° F. for two hours in the maker rack. After drying, a size coat %vas then applied by standard roll coating methods with approximately 21 lbs/ream being applied. The size mix consisted of the same 1:1 phenolic resin-filler ratio. However, a non-buffered synthetic cryolite with an average particle size of 25 microns was used as the filler. Drying and curing was then accomplished by heating the coated material for one hour at 150° F., four hours at 175° F., and 16 hours at 225° F.

After curing the material was humidified in the conventional manner to a moisture content of less than 8% by weight. The material was then uniformly flexed and die cut into seven inch discs. These were then evaluated on a conventional pneumatic disc grinder using 1018 cold rolled steel as a workpiece and compared to a control disc made and handled in exactly the same manner except the abrasive grain was fused alumina. In this test, the abrasive disc was placed on the disc grinder in the standard manner and a 1×2 ×11 inch workpiece was positioned so that it engaged the disc on the 1 inch flat side at a 10°–15° angle. The disc was passed back and forth along the workpiece.

The abrasive disc in this test was rotated at a nominal 5400 RPH's on a hard rubber type back-up pad 7" in diameter. Eight pounds of dead weight in-feed force was exerted on the workpiece. Testing was for 30 seconds after which stock removed from the bar was measured (weight before grind-weight after grind) and recorded. This sequence was continued until the measured stock removed was 5 grams or less per grinding interval. Total stock removed in this manner for the test disc was compared to the total stock removed for the control disc. (Relative cutting performance)

The high calcium (0.14 weight percent) slowly heated sol gel abrasive (substantially in accordance with the prior art) had only 97% of the cutting performance of standard and inexpensive fused alumina abrasive grain.

EXAMPLE 2

Example 1. was substantially repeated except that instead of slowly heating the dried granules as in Example 1., the granules were calcined at 550° C. for about 30 minutes and were then introduced into a rotary tube furnace at 1390° C. to rapidly heat them to above 1200° C. in accordance with the present invention. The granules (grains) were heated to 1390° C. in about 10 minutes and retained at 1390° C. for about 30 minutes to sinter the grains. Any other differences from Example 1. were minor. The resulting sintered grains were analyzed as having a calcium content of 0.11 weight percent and a specific gravity over 3.3 (greater than 85% of theoretical). Upon testing as described in Example 1., the discs were found to have a relative cutting performance which was 395 percent of the cutting performance of fused alumina abrasive grain. In other words, the grain of the invention had a cutting performance 3.95 times the cutting performance of fused alumina abrasive grain.

EXAMPLE 3

Example 2. was substantially repeated except that the dried grains were calcined at 600° C. instead of 550° C. The finished grain was found to have a calcium content of 0.12 weight percent and a density in excess of 85% of theoretical. The relative cutting performance was 4.39 times the performance of fused alumina abrasive grain.

EXAMPLE 4

Example 2. was substantially repeated except that the magnesium nitrate used was prepared by dissolving 720 grams of magnesium hydroxide in 1.66 gallons of water containing 1660 ml of concentrated nitric acid. The resulting solution was added to the sol while stirring. As in Example 2., gelling occurred immediately and stirring was continued for 5 minutes.

The resulting grain had a calcium content of near 0.08 weight percent, a density in excess of 85% of theoretical, and cutting performance about 4.5 times the cutting performance of fused alumina. In addition, the resulting grain had a cutting performance about 2.4 times the cutting performance of a commercial rapidly cooled fused alumina-zirconia grain and a cutting performance comparable to a commercial low calcium sintered sol gel alumina containing grain precoated on a commercial disc, which grain is similar to the low calcium and sodium grain described in U.S. Pat. No. 4,314,827.

EXAMPLE 5

A high calcium and sodium sol gel abrasive grain was made essentially in accordance with Example 2. In particular, 20,559 grams of Conden Chemie Disperal® boehmite was dispersed in 33.5 gallons of water and 1250 ml of concentrated technical grade nitric acid diluted with 2 gallons of water was then added to the dispersion to form a sol (colloidal solution).

6341 grams of magnesium nitrate was dissolved in 4 gallons of water and the resulting solution vias added to the sol with stirring. Gelling occurred almost immediately. Stirring was continued for about 5 minutes.

The gel was then transferred to plastic trays at a depth of between 2.5 and 3.75 centimeters. The trays were placed in an electrically heated dryer to dry the gel which took about 48 hours.

The dry gel was passed through a roll crusher to reduce it to −20 mesh granules. A size fraction −20 to +48 mesh was separated by sieving.

The granules were calcined at 550° C. for about 30 minutes and were then fast fired in a rotary tube furnace at 1.2 revolutions per minute at about 1395° C. to rapidly heat them to above 1200° C. in accordance with the invention. The granules (grains) were heated to 1390° C. for an additional 10 minutes. The resulting grain had a calcium content of about 0.07 weight percent and a sodium content of 0.015 weight percent. The density was in excess of 85% of theoretical.

The sintered granules were size classified on a conventional sifter to meet the ANSI 74.18-1977 specification for 36 grit.

A single coated abrasive material was made by electrostatically coating the 36 grit grain on a vulcanized fiber backing.

The fiber selected was abrasive grade 0.030 inch vulcanized fiber, having a nominal weight of 67 pounds per ream (480-9×11 sheets).

A maker adhesive mix, consisting of a commercial one-stage, liquid phenolic resin with a formaldehyde to phenol ratio of about 1:1 and ground limestone with an average particle size of between 17 and 25 microns, was made using a 1:1 net weight mix proportion.

The maker mix was then heated to 90° F. and roll coated on the fiber backing. About 23 pounds of adhesive per ream was applied.

Using conventional sandpaper making equipment, the 36 grit abrasive was electrostatically projected onto the fiber carrying the maker mix with about 62 pounds per ream of grain being applied.

The abrasive adhesive coated backing was then heated to 175° F. for one hour and 200° F. for two hours in the maker rack. After drying, a size coat was then applied by standard roll coating methods with approximately 23 lbs/ream being applied. The size mix consisted of the same 1:1 phenolic resin-filler ratio. Drying and curing was then accomplished by heating the coated material for one hour at 150° F., four hours at 175° F., and 16 hours at 225° F.

After curing the material was humidified in the conventional manner to a moisture content of less than 8% by weight. The material was then uniformly flexed and die cut into seven inch discs. Five of these discs were then evaluated on a conventional pneumatic disc grinder using quenched and tempered 4140 steel (hardness 285-320 BHN) as a workpiece and compared to a control disc made and handled in exactly the same manner except the abrasive grain was fused. alumina. In this test, the abrasive disc was placed on the disc grinder in the standard manner and a 1×2×11 inch workpiece was positioned so that it engaged the disc on the 1 inch flat side at a 10°–15° angle. The disc was passed back and forth along the workpiece.

The abrasive disc in this test was rotated at a nominal 5400 RPM's on a hard rubber type back-up pad 7" in diameter. Eight pounds of dead weight in-feed force was exerted on the workpiece. Testing was for 30 seconds after which stock removed from the bar was measured (weight before grind-weight after grind) and recorded. This sequence was continued until the measured stock removed was 5 grams or less per grinding interval. Total stock removed in this manner for the test disc was compared to the total stock removed for the control disc. (Relative cutting performance).

The high calcium and sodium (0.07 combined weight percent) rapidly heated sol gel abrasive had a mean cut of 612 grams (almost 7 times the cut of standard fused alumina). The results are shown in Table 1.

EXAMPLES 6–19

The procedure of Example 5 was followed except that various known quantities of calcium and sodium were added to the dispersion prior to the addition of magnesium nitrate. The sodium and calcium were added as sodium and calcium nitrate solutions. The sodium nitrate solution contained 0.54 grams per ml of $NaNO_3$, equivalent to 0.2 grams/ml calculated as $Na_2O$, and the calcium nitrate solution contained 0.58 grams per ml of $Ca(NO_3)_2$, equivalent to 0.2 grams/ml calculated as CaO. The results are set forth in Table 1. The calcium and sodium in the grain are analyzed by emission spectroscopy. The slight variation between added calcium and actual calcium in the grain is believed due to additional calcium present in magnesium nitrate and in water and the slight variation between added sodium and actual sodium in the grain is believed to be due to impurities in the components of the grain, especially water, and to some vaporization of sodium during calcining and sintering.

For comparison, the mean cut of traditional fused alumina grain is set forth in Table 1.

TABLE 1

| EXAMPLE | mls Ca++ | mls Na+ | % Ca in Grain | % Na in Grain | Mean Cut Grams |
| --- | --- | --- | --- | --- | --- |
| 5 | -0- | -0- | 0.06 | 0.01 | 612.0 |
| 6 | 24.9 | -0- | 0.08 | 0.02 | 644.8 |
| 7 | -0- | 83.0 | 0.06 | 0.06 | 504.8 |
| 8 | 83.0 | -0- | 0.13 | 0.01 | 494.6 |
| 9 | -0- | 166.0 | 0.06 | 0.12 | 437.6 |
| 10 | 24.9 | 83.0 | 0.08 | 0.07 | 424.0 |
| 11 | 166.0 | -0- | 0.18 | 0.04 | 424.0 |
| 12 | 83.0 | 166.0 | 0.13 | 0.13 | 383.2 |
| 13 | 373.5 | -0- | 0.33 | 0.02 | 369.8 |
| 14 | 166.0 | 166.0 | 0.18 | 0.12 | 326.4 |
| 15 | 166.0 | 270.0 | 0.19 | 0.21 | 275.4 |
| 16 | -0- | 270.0 | 0.06 | 0.18 | 270.0 |
| 17 | 83.0 | 270.0 | 0.13 | 0.20 | 242.4 |
| 18 | -0- | 481.5 | 0.06 | 0.27 | 197.2 |

TABLE 1-continued

| EXAMPLE | mls Ca++ | mls Na+ | % Ca in Grain | % Na in Grain | Mean Cut Grams |
|---|---|---|---|---|---|
| 19 | 373.5 | 481.5 | 0.36 | 0.36 | 185.4 |
| alumina | | | | | 88.2 |

EXAMPLE 20

Examples 7, 11 and 15 were repeated except that the grain was slowly fired in a manner similar to prior art Example 1. In particular, the grain was slowly fired in a stationary kiln from ambient temperature to 1500° C. over a time period of 16 hours followed by 30 minutes at 1500° C. The resulting abrasive were so poor that no cutting data could be obtained.

The foregoing examples clearly demonstrate the superiority of the cutting performance of high calcium and sodium sol gel abrasive grains manufactured in accordance with the process of the invention and show that when the step of rapidly heating dried high calcium and sodium sol gel to sintering temperature is omitted, as in the prior art, the resulting grain is an inferior grain.

EXAMPLES 21–23

Examples 5, 6 and 7 above were repeated respectively as Examples 21–23, as follows:

EXAMPLE 21

| Ingredients | Parts by Weight (grams) |
|---|---|
| Aluminum monohydrate (commercially available as Disperal ™) | 139.5 |
| Tap water | 911.8 |
| Concentrated nitrate acid | 8.48 |
| Magnesium nitrate as a 6% solids solution in water | 63.4 |

EXAMPLE 22

The ingredients for Example 22 were the same as those for Example 21 except 0.098 gram of calcium nitrate was added.

EXAMPLE 23

The ingredients for Example 23 were the same as that for Example 21 except 0.304 gram of sodium nitrate were added.

For each of Examples 21–23, after preparing a gel as described in Example 1, the gels in Pyrex™ dishes were dried by heating for two days in a laboratory oven heated at 230° C. The resultant dried gels were then crushed using a Braun pulverizer and a −20+50 mesh screen cut of crushed gel particles was taken. The crushed gel particles were calcined by heating at 550° C. for one-half hour. The calcined particles were then poured directly into a platinum crucible contained within a Rapid Temp™ kiln which was heated at 1395° C. The temperature of the kiln initially dropped to approximately 1370° C. but rapidly rose to 1395° C. and the crucible was heated at 1390° C. for an additional ten minutes to produce fired abrasive grains.

Polished cross sections of representative samples of each of the abrasive grains of Examples 21, 22 and 23 were prepared and measured for hardness by using a Vicker's diamond point indenter with a 500 gram load. The hardness values were as follows:

| Example No. | Hardness, GPa |
|---|---|
| 21 | 18.70 |
| 22 | 17.11 |
| 23 | 17.01 |

To confirm that Examples 21–23 were of substantially the same composition as Examples 5–7, the abrasive grains of Examples 21–23 were submitted for sodium content analysis by emission spectroscopy analysis, and for calcium and magnesium analysis by x-ray fluorescence analysis, with results as follows:

| Example No. | Sodium Content | Calcium (%) | Magnesium (%) |
|---|---|---|---|
| 21 | 0.011 | 0.055 | 6 |
| 22 | 0.011 | 0.073 | 6 |
| 23 | 0.044 | 0.056 | 6 |

Any difference in sodium and calcium content between the compositions of Examples 5–7 and their corresponding examples of Examples 21–23, are thought to exist because of the differences between the sodium and calcium contents of tap water, Examples 5–7 being made with Niagara Falls, N.Y. tap water whereas Examples 21–23 were made with St. Paul, Minn. tap water.

As can be seen from the hardness measurements described above, a 6% magnesia alpha-alumina-based ceramic according to the present invention has a hardness value of at least 17 GPa, and Example 21, which contained no added calcium or sodium besides that provided by tap water, a hardness of at least 18 GPa.

What is claimed is:

1. A process for forming alumina-based ceramic abrasive grains which comprises:
   a) preparing a dispersion comprising from about 2 to about 60 weight percent aluminum oxide monohydrate; a dissolved metal containing sintering aid in an atomic ratio of metal in the sintering aid to aluminum in the aluminum oxide monohydrate of from 1:2 to 1:35, and added sodium plus calcium compound sufficient to provide in the ceramic a sodium plus calcium content greater than about 0.1 to about 1.8 weight percent of solids, provided the weight percent calcium is from 0 to about 1.8 and the weight percent sodium is from 0 to about 0.4 and from 2 to 40 weight percent aluminum oxide monohydrate is in the dispersion;
   b) gelling said dispersion;
   c) drying the gelled dispersion at a temperature below the frothing temperature of the gel to vaporize free water;
   d) crushing the dried solid to form grains;
   e) rapidly heating the grains to above about 1200° C. in less than 10 minutes; and
   f) continuing to heat the grains at a sintering temperature between about 1200° C. and about 1650° C. for a sufficient sintering time to sinter the grains to a density above about 85% of theoretical density.

2. The process of claim 1 also including the step of calcining the grains before step (e).

3. The process of claim 1 wherein the quantity of added sodium plus calcium compound is sufficient to provide in the ceramic a weight percent calcium plus a weight percent sodium of less than 0.6.

4. The process of claim 1 wherein the quantity of added sodium plus calcium compound is sufficient to provide in the ceramic a weight percent calcium plus a weight percent sodium of less than 0.15.

5. The process of claim 1 wherein in step (a) the atomic ratio of metal in the sintering aid to aluminum in the aluminum oxide monohydrate is from 1:7 to 1:25.

6. The process of claim 1 wherein all solids in the dispersion are in dissolved or colloidal form.

7. The process of claim 2 wherein the grains are calcined at a temperature of from about 250° C. to about 800° C. until essentially all water is removed.

8. The process of claim 2 wherein the grains are calcined at a temperature of from about 300° C. to about 600° C. for from about 5 to about 20 minutes.

9. The process of claim 1 wherein the sintering aid is a water soluble compound of magnesium, zinc, nickel or cobalt.

10. The process of claim 1 wherein the sintering aid is prepared in situ from magnesium oxide or magnesium hydroxide and an inorganic acid.

11. The process of claim 1 wherein the sintering aid is magnesium nitrate.

12. The process of claim 1 wherein the sufficient sintering time is from about 5 to about 30 minutes.

13. The process of claim 1 wherein the sufficient sintering time is less than 5 minutes.

14. The process of claim 1 wherein the sintering temperature is between 1250° C. and 1500° C.

15. The process of claim 1 wherein at least a portion of said sintering occurs above 1300° C.

16. The process of claim 1 wherein the rapid heating occurs in less than one minute.

17. The process of claim 1, wherein in step (a) from about 0.05 to about 0.25 mole of volatile acid per mole if aluminum oxide monohydrate is added as a dispersing aid to the dispersion.

18. The process of claim 17 wherein the acid is nitric acid.

19. The process of claim 1 wherein in step (a) the dispersion contains from about 10 to about 40 weight. percent aluminum oxide monohydrate.

20. The process of claim 1 wherein at least one precursor of at least one component selected from the group consisting of silica, chromia, titanium oxide, and zirconia is added to the liquid dispersion of step
   (a) in colloidal or dissolved form, said precursor being present in an amount up to 50 weight percent of solids in the dispersion.

21. A process for forming alumina-based ceramic abrasive grains which comprises:
   a) preparing a dispersion comprising from about 2 to about 60 weight percent aluminum oxide monohydrate; a dissolved metal containing sintering aid in an atomic ratio of metal in the sintering aid to aluminum in the aluminum oxide monohydrate of from 1:2 to 1:35, and added alkali metal plus calcium compound sufficient to provide in the ceramic an alkali metal plus calcium content greater than about 0.1 to about about 1.8 weight percent of solids, provided the weight percent calcium is from 0 to about 1.8 and the weight percent alkali metal is from 0 to about 0.4 and from 2 to 40 weight percent aluminum oxide monohydrate is in the dispersion;
   b) gelling said dispersion;
   c) drying the gelled dispersion at a temperature below the frothing temperature of the gel to vaporize free water;
   d) crushing the dried solid to form grains;
   e) rapidly heating the grains to above about 1200° C. in less than 10 minutes; and
   f) continuing to heat the grains at a sintering temperature between about 1200° C. and about 1650° C. for a sufficient sintering time to sinter the grains to a density above about 85% of theoretical density.

22. A process for forming alumina-based ceramic abrasive grains which comprises:
   a) preparing a dispersion comprising from about 2 to about 60 weight percent aluminum oxide monohydrate; a dissolved metal containing sintering aid in an atomic ratio of metal in the sintering aid to aluminum in the aluminum oxide monohydrate of from 1:2 to 1:35, and added alkali metal plus calcium compound sufficient to provide in the ceramic an alkali metal plus calcium content greater than about 0.1 weight percent of solids and from 2 to 40 weight percent aluminum oxide monohydrate is in the dispersion;
   b) gelling said dispersion;
   c) drying the gelled dispersion at a temperature below the frothing temperature of the gel to vaporize free water;
   d) crushing the dried solid to form grains;
   e) rapidly heating the grains to above about 1200° C. in less than 10 minutes; and
   f) continuing to heat the grains at a sintering temperature between about 1200° C. and about 1650° C. for a sufficient sintering time to sinter the grains to a density above about 85% of theoretical density.

* * * * *